E. B. HORN.
Lamp.
No. 63.
A. I. Patented Dec. 17, 1842.
BEST AVAILABLE COPY
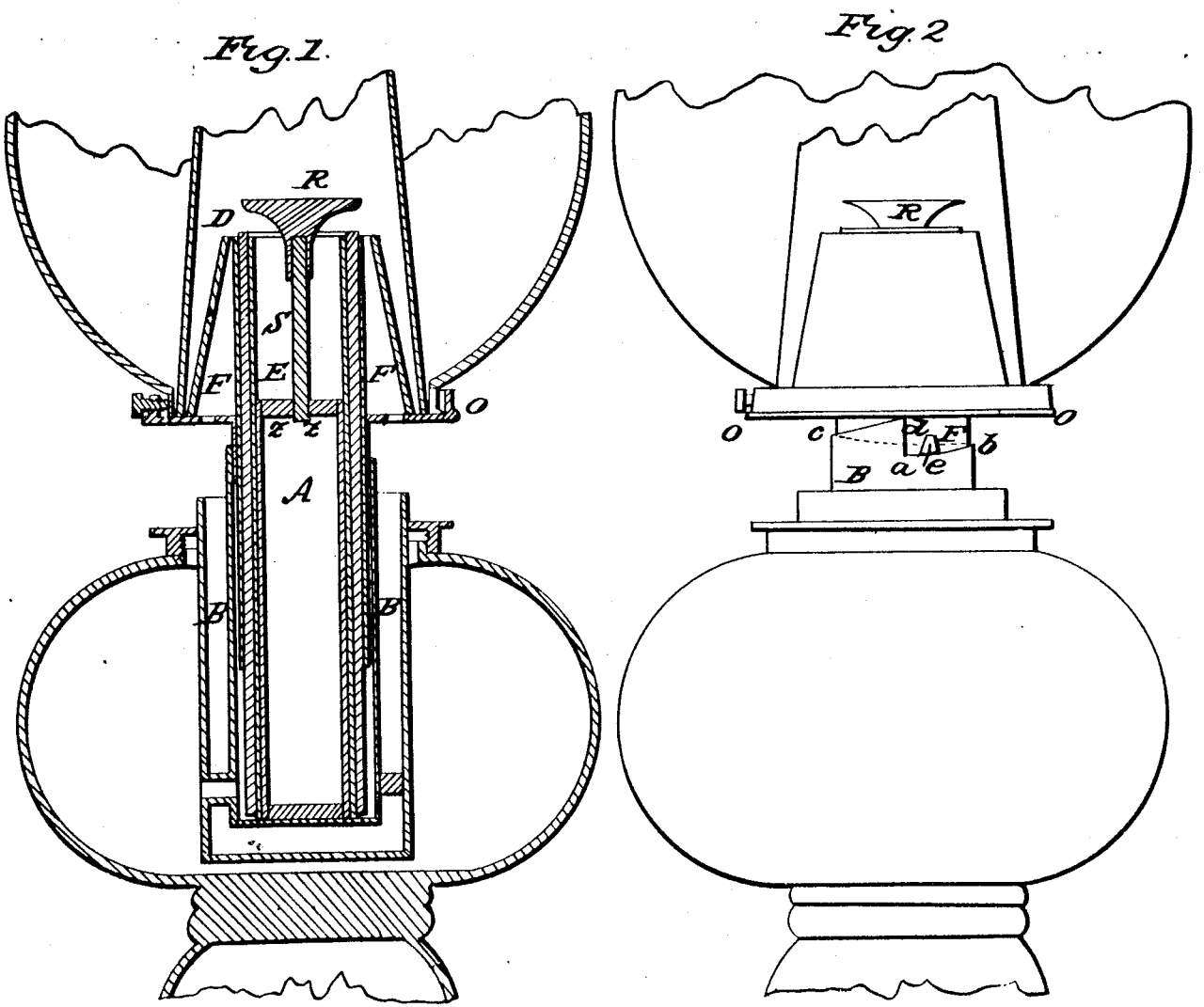
H. PETERS, Photo-Lithographer, Washington, D.C.